May 3, 1966 V. G. M. CHATFIELD 3,249,363
SEAL AND METHOD OF INSTALLING SAME
Filed June 17, 1963 5 Sheets-Sheet 2

INVENTOR.
VICTOR G. M. CHATFIELD
BY
Raymond A. Paquin
ATTORNEY.

INVENTOR.
VICTOR G. M. CHATFIELD
BY
Raymond A. Paquin
ATTORNEY.

INVENTOR.
VICTOR G.M. CHATFIELD
BY
Raymond A. Paquin
ATTORNEY.

United States Patent Office 3,249,363
Patented May 3, 1966

3,249,363
SEAL AND METHOD OF INSTALLING SAME
Victor G. M. Chatfield, Lasalle, Quebec, Canada, assignor to Dominion Engineering Works, Limited
Filed June 17, 1963, Ser. No. 288,280
13 Claims. (Cl. 277—1)

This invention relates to seals or the like, and has particular reference to the provision of a new and improved method of installing a seal on a shaft without the necessity of access to either end of the shaft, and to the seal provided by said method.

Conventionally, when a seal is to be installed upon a shaft, the ends of which are obstructed, either the obstructions are removed or lengths of rubber packing are wrapped around the shaft to be sealed and the ends of said rubber then spliced together.

Such sealing methods, however, possess inherent disadvantages and difficulties. With regard to the method requiring the removal of the obstruction, such can be very expensive in both time and money, depending upon the complexity and size of the equipment. The second conventional method, employing rubber packing, is prone to difficulty in control of the splice and therefore to the possibility of premature failure. Thus, neither of these conventional methods of installing a seal on a shaft, where there is no access to the ends of the shaft, is satisfactory.

An object of the present invention is to provide a new and improved method of installing a seal on a shaft without the necessity of obtaining access to either end of the shaft, or disturbing the equipment to which the shaft is connected.

Another object of the invention is to provide a new and improved sealing method of the type set forth which is particularly adapted to the use of an endless seal as, for example, an O-ring type seal.

Another object of the invention is to provide a new and improved sealing method of the type set forth which is particularly adapted to the use of an endless seal as, for example, an O-ring type seal, where parts of the equipment larger in diameter than the packing space obstruct the entry of the O-ring type seal or the like into the packing space.

Another object is to provide a new and improved sealing method of the type set forth which removes the possibility of failure due to defective splice in the seal by permitting the installation of a one-piece packing ring or seal where, in the past, field splicing was necessary.

Another object is to provide a new and improved sealing method of the type set forth which is both more economical and more efficient than conventional sealing methods.

Another object of the invention is to provide the new and improved seal provided by the sealing method set forth herein.

Other objects and advantages of the invention will be apparent from the following description taken in connection with the accompanying drawings. It will be understood that changes may be made in the details of construction and arrangement of parts shown and described, as the preferred form of the invention has been given by way of illustration only.

Referring to the drawings.

Figure 2:
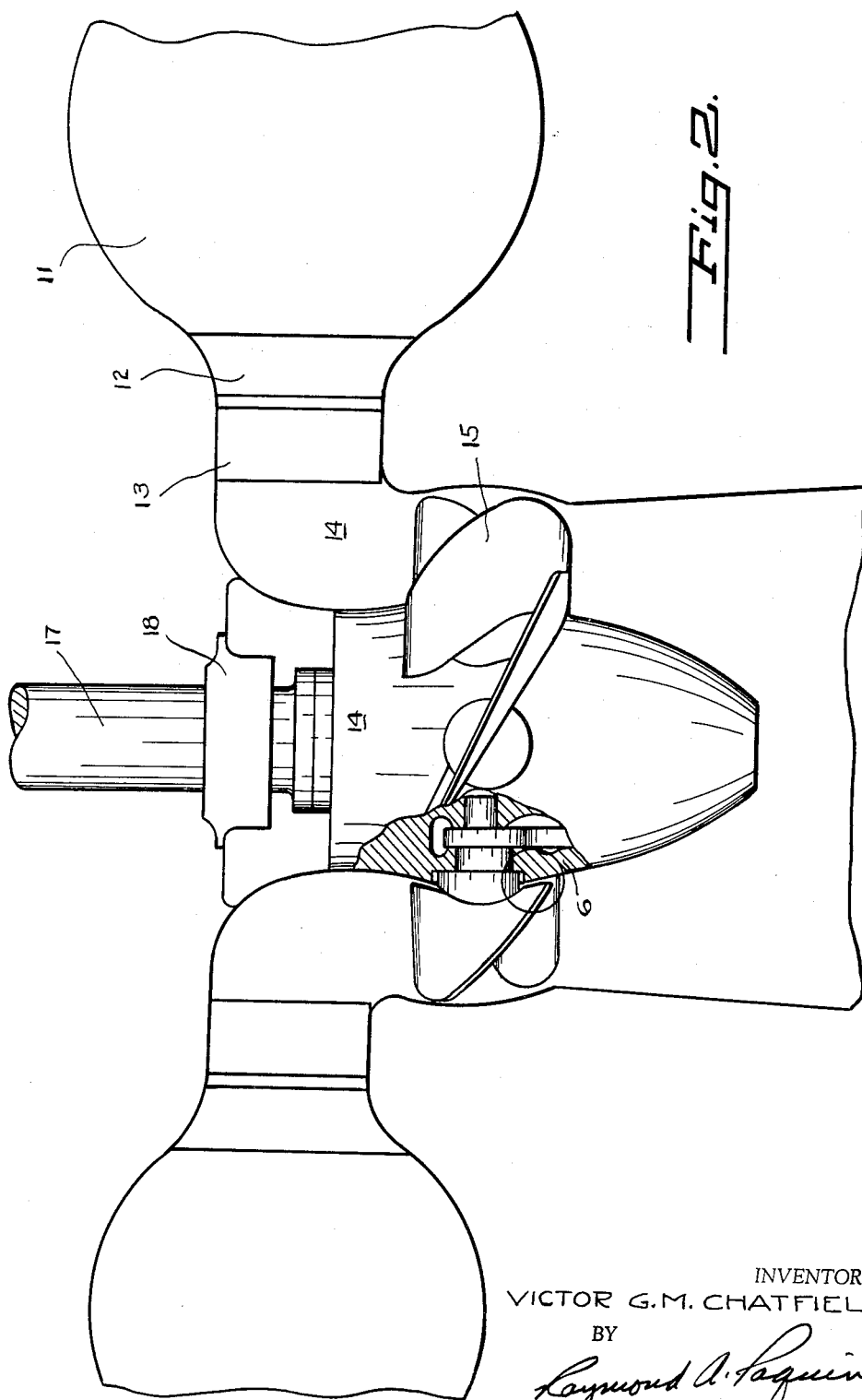
FIG. 2 is a side view partially in section of a hydraulic machine of the Kaplan type embodying a form of the seal provided by the present invention.

Referring more particularly to the drawings wherein similar reference characters designate corresponding parts throughout, and with particular reference to FIG. 2 of the drawings, such illustrates the positioning of a seal provided in accordance with the present invention with respect to its application to a hydraulic turbine or pump-turbine of the Kaplan type. When the hydraulic pump-turbine shown therein functions as a turbine, water from inlet casing 11 is directed by stay vanes 12 and wicket gates 13 to the runner which is shown generally at 14, and then passes over the blades 15 before being discharged. Shaft 17 is attached to runner 14 and journalled in guide bearing 18. When said machine functions as a pump, the water flow direction is reversed and shaft 17 is rotated by external power.

It will be obvious that should any of the sealing rings 1 located between the runner blade shaft or trunnion 2 and housing 6 become damaged, the water surrounding runner 14 will leak into the blade adjusting mechanism (FIG. 2).

The conventional method of replacing seal ring 1 in a Kaplan hub, necessitates either fitting a new seal ring having a spliced joint or removing the entire runner assembly from its operating position and then dismantling from the housing the blade with the defective seal.

Both of the above methods are unsatisfactory, costly and time consuming.

Figure 3A:
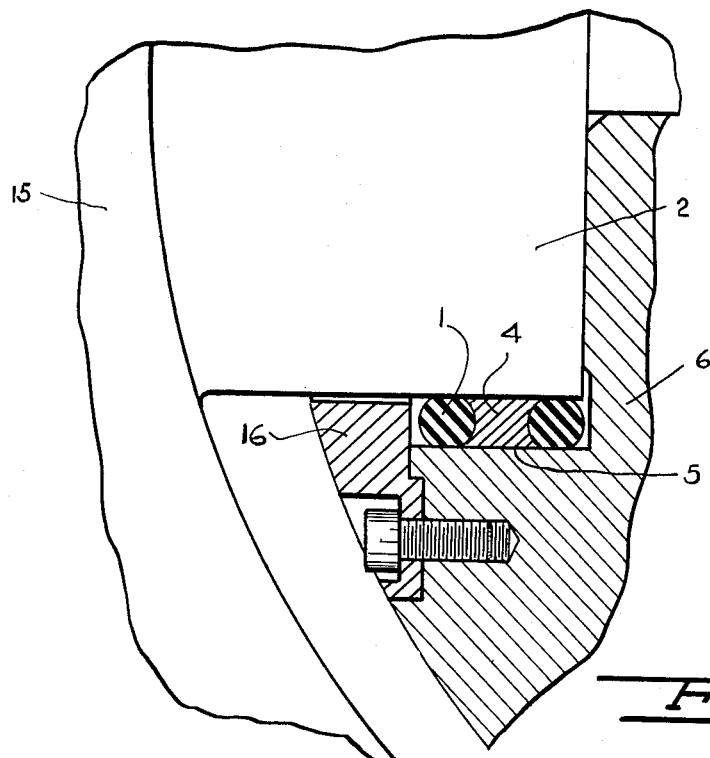
FIG. 3A is an enlarged sectional view of that portion of FIG. 2 shown encircled, showing a seal constructed in accordance with the present invention positioned in the hydraulic machine of FIG. 2.

With reference to FIG. 3A of the drawings, such illustrates the details of a seal provided in accordance with the invention, positioned in the hydraulic machine of FIG. 2, said seal being maintained in counterbore 5 in runner hub 6 by means of the segmental seal retaining ring 16.

Figure 3B:
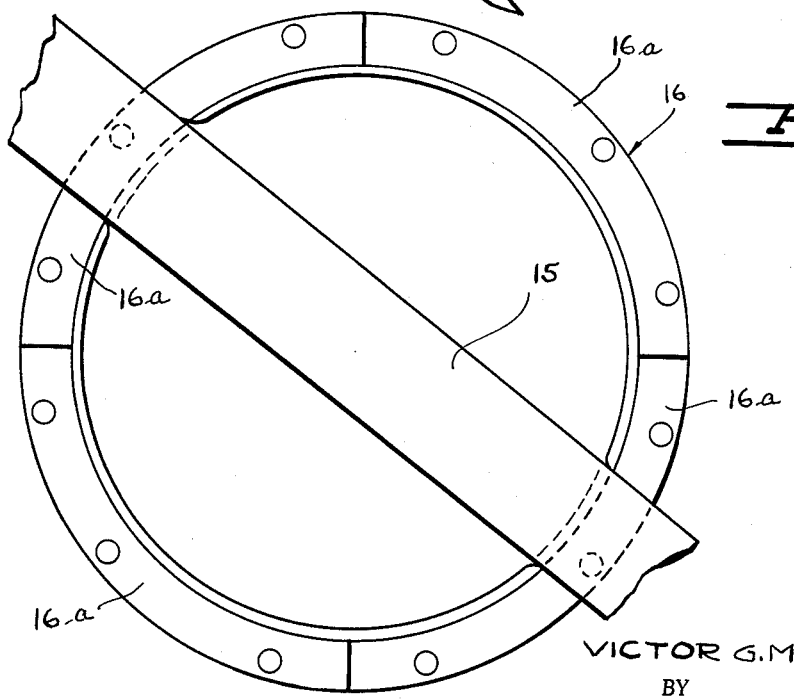
FIG. 3B is an end view of a blade shown in FIG. 3A.
Figure 4:
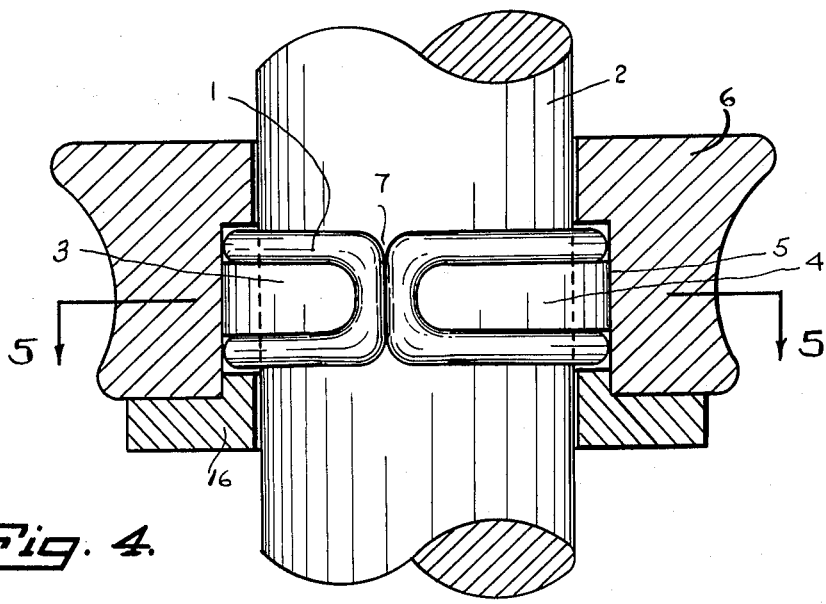
FIG. 4 is a top view of a form of the seal herein provided in assembled relation.
Figure 5:
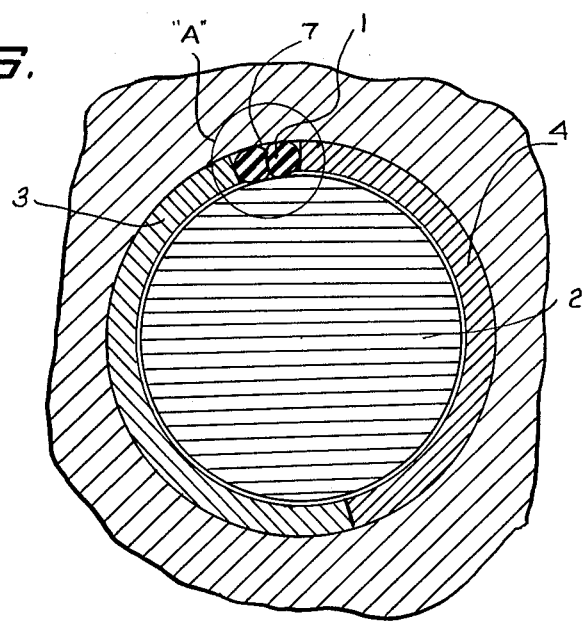
FIG. 5 is a sectional view on line 5—5 of FIG. 4.
Figure 6:
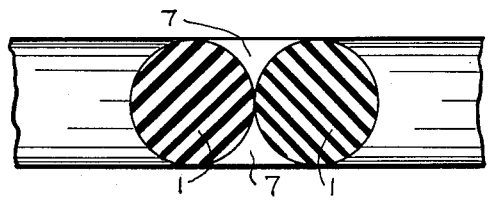
FIG. 6 is a sectional view on line 6—6 of FIG. 1.

FIG. 3B of the drawings illustrates segmental seal retaining ring 16 in relation to a blade 15 of the hydraulic machine. Seal retaining ring 16 comprises four segments 16a which are shown in assembled relationship.

With regard to FIGS. 4 through 10, such illustrate details of seals constructed in accordance with the present invention.

The seal provided by the present invention comprises the molded rubber O-ring or similar endless member 1 which is of a length substantially equal to twice the circumference of shaft 2 and is folded and wrapped around shaft 2 and inserted into counterbore 5, shaft 2 being mounted in housing 6.

Figure 7:
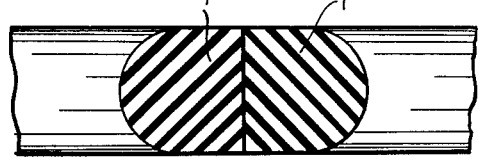
FIG. 7 is an enlarged view of that portion of FIG. 5 shown encircled at "A" and illustrates the seal ring loop ends in a compressed condition.
Figure 8:
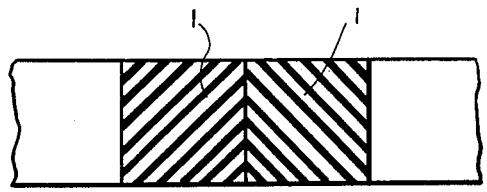
FIG. 8 is a view similar to FIG. 7, but shows a modified form of the seal.

The metal spacers 3 and 4 that are positioned around the shaft 2 serve to squeeze and hold in intimate relationship the looped ends of O-ring 1 and separate the folds of said O-ring. Said spacers are so constructed that, when placed in position in bore 5, they will exert the necessary pressure and close gap 7 between the looped ends of folded O-ring 1. In this manner, when the O-ring 1 is constructed of relatively soft rubber, the two parts will be deformed by compression and gap 7 closed as shown in FIG. 7. As an alternative construction to that shown in FIG. 7, O-ring 1 may equally well be constructed of square-sectioned rubber or the like, as shown in FIG. 8.

Figure 9:
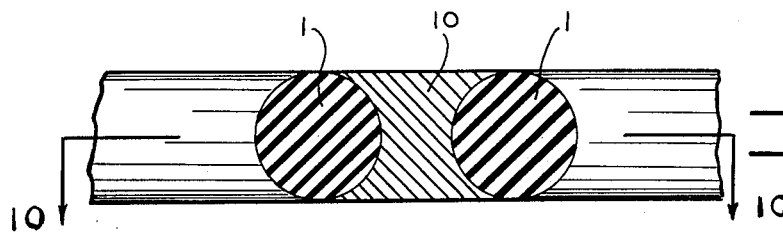
FIG. 9 is another view similar to FIG. 7, but showing another modified form of the seal.
Figure 10:
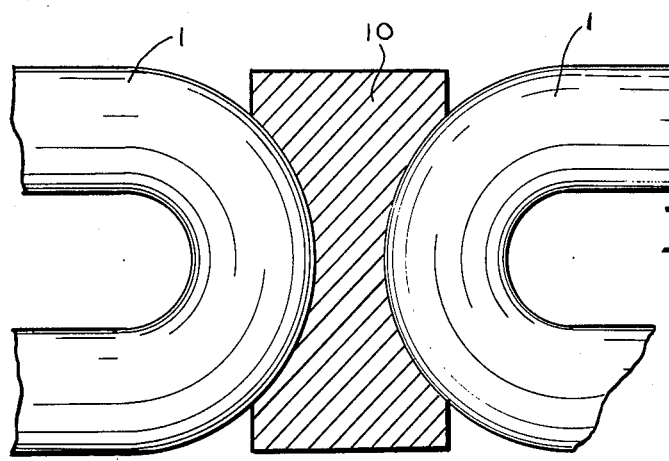
FIG. 10 is a sectional view on line 10—10 of FIG. 9.

In applications where O-ring 1 is constructed of a material too hard for the gap 7 to be closed in the foregoing manner, a filler piece 10 of resilient material, preferably similar in properties to the material of which the O-ring is constructed, can be inserted between the end loops of said O-ring and, thus, close the gap 7 as is shown in FIGS. 9 and 10.

Figure 1:
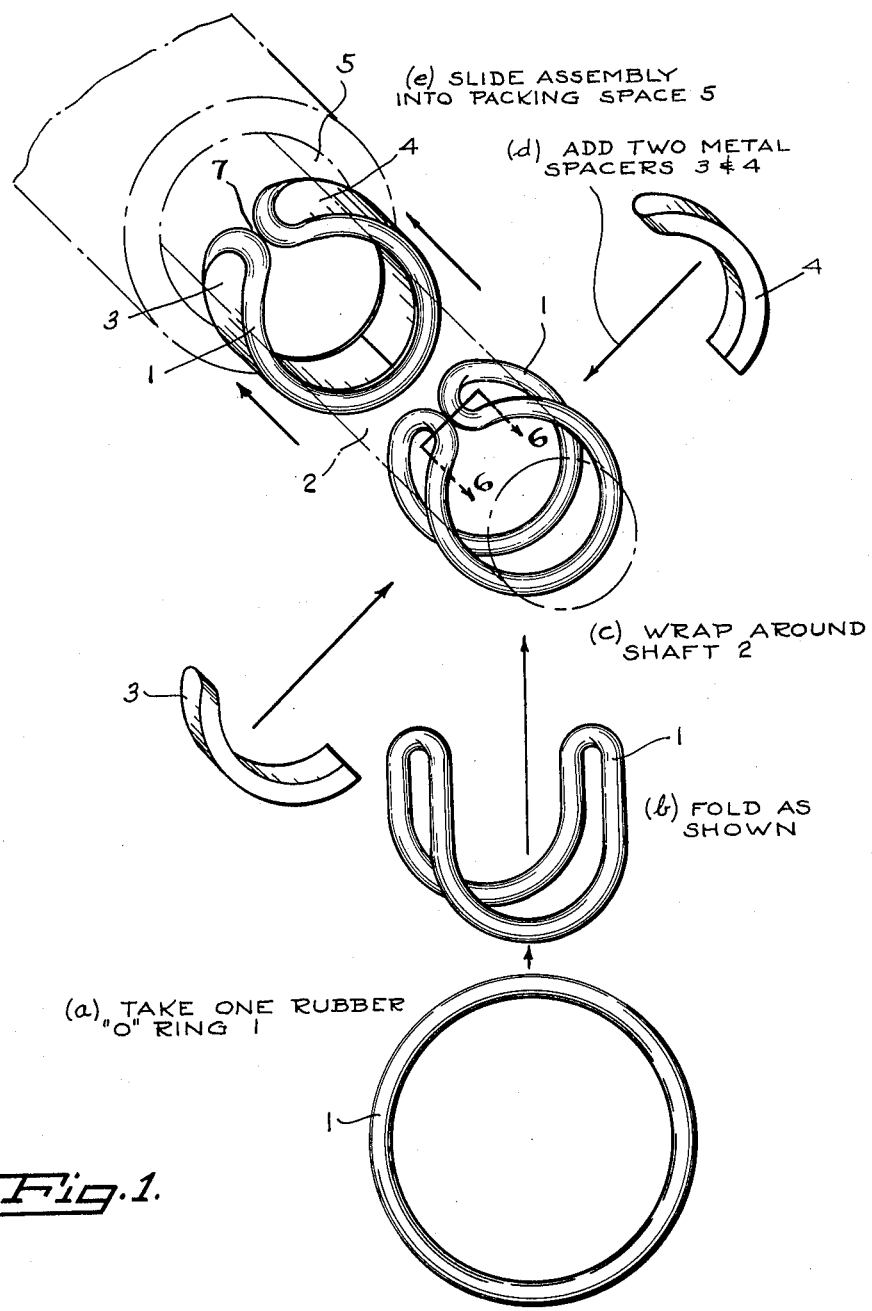
FIG. 1 is a view in perspective illustrating the sealing method provided by the present invention with the seal elements in unassembled relation.

With particular reference to the method provided by the present invention for constructing the finished seal, such is illustrated in FIG. 1. The molded rubber O-ring 1 is folded and wrapped around the shaft 2; the metal spacers 3 and 4 are placed together around said shaft and between the two folds of material comprising said O-ring in order to separate said folds. The assembly comprising O-ring 1 and spacers 3 and 4 is then slid along shaft 2 and inserted in counterbores 5, where because of the relationship between spacers 3 and 4 and counterbore 5, the looped ends of said folds are squeezed together thereby closing gap 7.

The seal is then completed unless, as previously described, the composition of the O-ring 1 is such that said spacers 3 and 4 are unable to force the folds thereof to close gap 7 in which case, filler means 10 or the like is positioned to close said gap.

For clarity of presentation, only two spacers 3 and 4 have been shown and described. However, it will be understood that more than two spacers may be employed without departing from the spirit or scope of the invention.

From the foregoing, it will be seen that I have provided a new and improved method for constructing a seal of the type set forth, and a new and improved seal constructed in accordance with said method.

I claim:

1. The method of installing a seal on a shaft without the necessity of access to either end of the shaft comprising, providing an endless member of seal material of a length substantially twice the circumference of said shaft, wrapping said member around said shaft, and forcing said member axially into a cavity in a housing surrounding said shaft.

2. The method of installing a seal on a shaft without the necessity of access to either end of the shaft comprising, providing an endless member of seal material of a length substantially twice the circumference of said shaft, wrapping said member around said shaft, providing a filler between the ends of said member, and forcing said member and filler together axially into a cavity in a housing surrounding said shaft.

3. The method of installing a seal on a shaft without the necessity of access to either end of the shaft comprising, providing a pair of endless members of seal material with said members being of a length substantially twice the circumference of said shaft, wrapping said members around said shaft in spaced relation axially of said shaft and forcing said members axially into a cavity in said housing surrounding said shaft.

4. In a device of the character described, a seal adapted for installation on a shaft without the necessity of access to either end of the shaft, said seal comprising an endless member of seal material wrapped around said shaft, said member of seal material being of a length substantially twice the circumference of said shaft, and a pair of oppositely-disposed spacers, said member of seal material and said spacers being forced axially into a cavity in a housing in said shaft.

5. In a device of the character described, a seal adapted for installation on a shaft without the necessity of access to either end of the shaft, said seal comprising an endless member of seal material wrapped around said shaft, said member of seal material being of a length substantially twice the circumference of said shaft, a pair of oppositely-disposed spacers, said member of seal material and said spacers being forced axially into a cavity in a housing in said shaft, and filler means between the ends of said seal member for completing the encirclement of said shaft by said seal.

6. The method of installing a seal on a shaft without the necessity of access to either end of the shaft comprising, providing a member of seal material of a length substantially twice the circumference of said shaft, wrapping said member around said shaft, providing a filler between end loops of said member, and forcing said member and filler together axially into a cavity in a housing surrounding said shaft.

7. The method of installing a seal on a shaft without the necessity of access to either end of the shaft comprising, providing a member of seal material of a length substantially twice the circumference of said shaft, wrapping said member around said shaft with end loops thereof in abutting relation, and forcing said member axially into a cavity in a housing surrounding said shaft.

8. The method of installing a seal on a shaft without the necessity of access to either end of the shaft comprising, providing a member of seal material of a length substantially twice the circumference of said shaft, wrapping said member around said shaft, placing spacer means adjacent end loops of said sealing member to keep said end loops in abutting contact, and forcing said member axially into a cavity in a housing surrounding said shaft.

9. The method of installing a seal on a shaft without the necessity of access to either end of the shaft comprising, providing a member of seal material of a length substantially twice the circumference of said shaft, wrapping said member around said shaft, providing a filler between end loops of said member, placing spacer means adjacent the end loops of said sealing member to keep said end loops in abutting contact, and forcing said member and filler together axially into a cavity in a housing surrounding said shaft.

10. The method of installing a seal on a shaft without the necessity of access to either end of the shaft comprising, providing an endless member of seal material of a length substantially twice the circumference of said shaft, wrapping said member around said shaft, placing spacer means adjacent end loops of said sealing member to keep said end loops in abutting contact, and forcing said member axially into a cavity in a housing surrounding said shaft.

11. The method of installing a seal on a shaft without the necessity of access to either end of the shaft comprising, providing a pair of members of seal material with said members being of a length substantially twice the circumference of said shaft, wrapping said members around said shaft in spaced relation axially of said shaft, placing spacer means adjacent end loops of said sealing members to keep said end loops in abutting contact, and forcing said members axially into a cavity in said housing surrounding said shaft.

12. In a device of the character described, a seal adapted for installation on a shaft without the necessity of access to either end of the shaft, said seal comprising an endless member of seal material wrapped around said shaft having end loops in abutting relation, said member of seal material being of a length substantially twice the circumference of said shaft, and a pair of oppositely-disposed end loop spacers, said member of seal material and said spacers being forced axially into a cavity in a housing in said shaft.

13. In a device of the character described, a seal adapted for installation on a shaft without the necessity of access to either end of the shaft, said seal comprising an endless member of seal material wrapped around said shaft having end loops in abutting relation, said member of seal material being of a length substantially twice the circumference of said shaft, a pair of oppositely-disposed end loop spacers, said member of seal material and said spacers being forced axially into a cavity in a housing in said shaft, and filler means between the end loops of said seal member for completing the encirclement of said shaft by said seal.

References Cited by the Examiner

UNITED STATES PATENTS

| | | | |
|---|---|---|---|
| 2,726,886 | 12/1955 | Thomas | 277—9 |
| 3,183,587 | 5/1965 | Baskell | 277—1 X |

SAMUEL ROTHBERG, *Primary Examiner.*